(12) United States Patent
Wang et al.

(10) Patent No.: US 9,742,613 B2
(45) Date of Patent: *Aug. 22, 2017

(54) METHOD AND SYSTEM FOR I/Q MISMATCH CALIBRATION AND COMPENSATION FOR WIDEBAND COMMUNICATION RECEIVERS

(71) Applicant: Maxlinear, Inc., Carlsbad, CA (US)

(72) Inventors: Yongtao Wang, Carlsbad, CA (US); Curtis Ling, Carlsbad, CA (US); Timothy Gallagher, Carlsbad, CA (US)

(73) Assignee: Maxlinear, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/937,500

(22) Filed: Nov. 10, 2015

(65) Prior Publication Data

US 2016/0065404 A1    Mar. 3, 2016

Related U.S. Application Data

(63) Continuation of application No. 14/469,281, filed on Aug. 26, 2014, now Pat. No. 9,184,976, which is a (Continued)

(51) Int. Cl.
*H03D 3/22* (2006.01)
*G01S 3/16* (2006.01)
(Continued)

(52) U.S. Cl.
CPC ...... *H04L 27/3863* (2013.01); *H04L 27/2334* (2013.01); *H04L 27/2338* (2013.01); *H04L 27/361* (2013.01); *H04L 27/366* (2013.01)

(58) Field of Classification Search
CPC ... H04L 27/2647; H04L 27/366; H04L 27/38; H04L 27/2334; H04L 27/2338; H04L 2027/0067; H04L 2027/0089
(Continued)

(56) References Cited

U.S. PATENT DOCUMENTS 6,155,980 A * 12/2000 Chiao .................. G01S 15/8961
600/447
6,240,150 B1 * 5/2001 Darveau ................ H04B 15/02
375/222

(Continued)

*Primary Examiner* — Daniel Washburn
*Assistant Examiner* — Sarah Hassan
(74) *Attorney, Agent, or Firm* — McAndrews, Held & Malloy

(57) ABSTRACT

Methods and systems for I/O mismatch calibration and compensation for wideband communication receivers may include receiving a radio frequency (RF) signal in a receiver of a communication device, down-sampling said received RF signal to generate a channel k and its image channel −k at baseband frequencies, determining average in-phase (I) and quadrature (Q) gain and phase mismatch of said channel k and said image channel −k, removing said average I and Q gain and phase mismatch of said channel k and said image channel −k, determining, after said removing said average I and Q gain and phase mismatch, a residual phase tilt of said channel k and said image channel −k, and compensating for said determined residual phase tilt of said channel k and said image channel −k utilizing a phase tilt correction filter.

27 Claims, 5 Drawing Sheets

Related U.S. Application Data continuation of application No. 13/462,717, filed on May 2, 2012, now Pat. No. 8,817,834.

(60) Provisional application No. 61/481,661, filed on May 2, 2011.

(51) Int. Cl.
  *H04L 27/38* (2006.01)
  *H04L 27/36* (2006.01)
  *H04L 27/233* (2006.01)

(58) Field of Classification Search
  USPC .......................................... 375/332; 342/378
  See application file for complete search history.

(56) References Cited

U.S. PATENT DOCUMENTS

| | | |
|---|---|---|
| 2001/0008420 A1 | 7/2001 | Opris |
| 2001/0008559 A1 | 7/2001 | Roo |
| 2001/0021813 A1 | 9/2001 | Yonce |
| 2002/0007386 A1 | 1/2002 | Martin et al. |
| 2002/0091317 A1* | 7/2002 | Chiao ................. G01S 7/52047 600/443 |
| 2003/0031273 A1* | 2/2003 | Mohindra ........... H04L 27/3809 375/324 |
| 2003/0073916 A1 | 4/2003 | Yonce |
| 2003/0235255 A1 | 12/2003 | Ketchum et al. |
| 2004/0021594 A1 | 2/2004 | Melanson |
| 2004/0088108 A1* | 5/2004 | Bloebaum ............. G01S 5/0036 342/378 |
| 2005/0113120 A1* | 5/2005 | Rappaport ........... H04B 7/0413 455/500 |
| 2005/0237835 A1 | 10/2005 | Hung et al. |
| 2006/0039425 A1 | 2/2006 | Betin et al. |
| 2006/0039506 A1* | 2/2006 | D'Alessandro ..... H04L 27/3863 375/324 |
| 2006/0067413 A1 | 3/2006 | Tssai |
| 2007/0058755 A1* | 3/2007 | Husted ................ H04L 27/3872 375/332 |
| 2007/0160159 A1* | 7/2007 | Song ................... H04L 25/0232 375/260 |
| 2008/0240268 A1 | 10/2008 | Yu et al. |
| 2011/0007847 A1* | 1/2011 | O'Keeffe ............. H04L 25/062 375/319 |
| 2011/0128997 A1 | 6/2011 | da Silva et al. |
| 2012/0033683 A1 | 2/2012 | Sahlin et al. |

\* cited by examiner

METHOD AND SYSTEM FOR I/Q MISMATCH CALIBRATION AND COMPENSATION FOR WIDEBAND COMMUNICATION RECEIVERS

CROSS-REFERENCE TO RELATED APPLICATIONS/INCORPORATION BY REFERENCE

This application is a continuation of application Ser. No. 14/469,281 filed on Aug. 26, 2014, which is a continuation of application Ser. No. 13/462,717 filed on May 2, 2012, which makes reference to and claims priority to U.S. Provisional Application Ser. No. 61/481,661 filed on May 2, 2011, each of which is hereby incorporated herein by reference in its entirety.

FIELD OF THE INVENTION

Certain embodiments of the invention relate to data communication. More specifically, certain embodiments of the invention relate to a method and system for I/O mismatch calibration and compensation for wideband communication receivers.

BACKGROUND OF THE INVENTION

Television providers have moved significantly toward cable and satellite technology for providing content to users, but terrestrial transmission still has significant usage worldwide. Analog television signals are still utilized in many areas of the world, and are also utilized in portions of digital provider networks.

Receivers introduce undesirable impairments to a signal when the signal is being amplified, filtered or downconverted. For example, direct conversion receivers (also referred to as "DCR", "zero IF receivers", or "ZIF receivers") are a very efficient way of implementing a radio receiver. However these receivers introduce a variety of impairments to a signal which can degrade overall performance of the system. Most notably, DC offset and signal image due to imbalances in the complex signal path, often referred to as "I/Q mismatch," may corrupt the downconverted signal. Existing methods for performing DC offset cancellation (DCOC) and I/Q calibration (IQ cal) can be effective at mitigating these problems. However, for signals which require very high signal to noise ratio such as analog TV signals, the residual impairment due to the limitations of these techniques can still leave visible artifacts in the analog picture screen.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for I/Q mismatch calibration and compensation for wideband communication receivers, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for I/Q mismatch calibration and compensation for wideband communication receivers. Exemplary aspects of the invention may comprise receiving a plurality of radio frequency (RF) channels, downconverting the received plurality of RF channels to baseband frequencies, determining average in-phase (I) and quadrature (Q) gain and phase mismatch of the downconverted channels, removing the determined average I and Q gain and phase mismatch, determining a residual phase and amplitude tilt of the downconverted channels with removed average I and Q gain and phase mismatch, and compensating for the determined residual phase and amplitude tilt. A curvature of gain mismatch may be determined for the downconverted channels utilizing a blind source separation (BSS) estimation algorithm and a frequency of the down-converted channels may be shifted in a direction based on the determined curvature. The determined phase tilt may be compensated utilizing a phase tilt correction filter, which may comprise one or more all-pass filters. A signal may be passed through the phase tilt correction filter for the compensation, wherein the signal comprises a sum of two channels shifted in frequency based on a determined curvature of the gain mismatch. The average I and Q gain and phase mismatch may be determined utilizing a blind source separation (BSS) estimation algorithm. An estimating function of the BSS algorithm may be averaged over a number of samples and a separating matrix may be updated based on the averaging. The receiver may comprise a direct conversion receiver.

Figure 1:
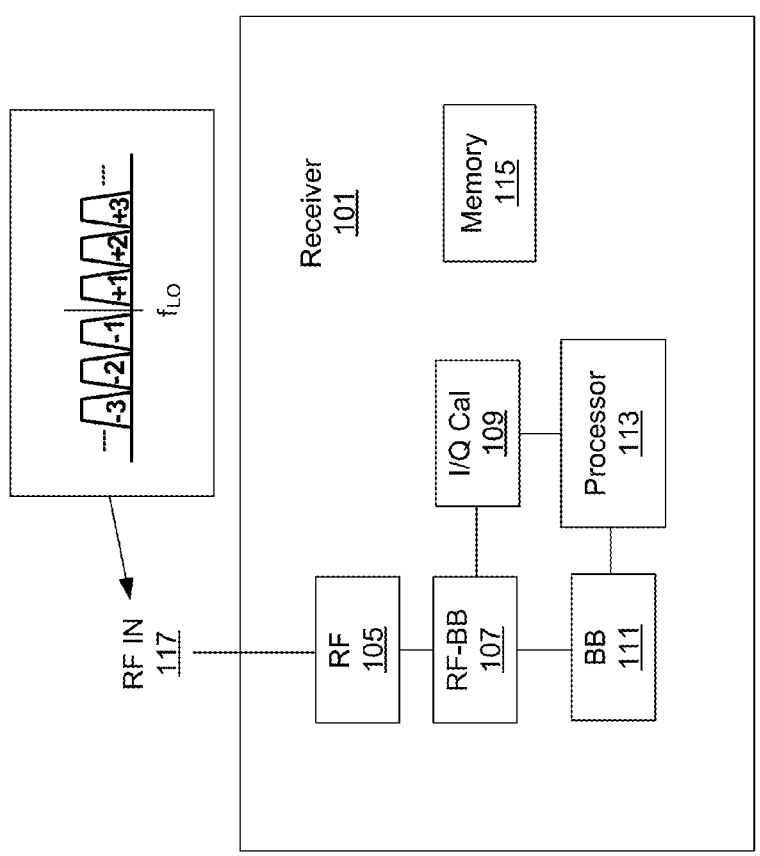
FIG. 1 is a diagram of an exemplary communication device with I/Q mismatch calibration and compensation, in accordance with an embodiment of the invention.

FIG. 1 is a diagram of an exemplary communication device with I/Q mismatch calibration and compensation, in accordance with an embodiment of the invention. Referring to FIG. 1, there is shown the receiver 101 comprising a radio frequency (RF) module 105, an RF-to-baseband conversion module 107, an in-phase and quadrature (I/Q) calibration and compensation module 109, a baseband module 111, a processor 113, and a memory 115.

The RF module 105 may comprise one or more RF receive (Rx) and transmit (Tx) paths for receiving signals from a satellite system, cable TV head-end, and/or terrestrial TV antennas, for example. The RF module 105 may comprise impedance matching elements, LNAs, power amplifiers, variable gain amplifiers, and filters, for example. The RF module 105 may thus be operable to receive, amplify, and filter RF signals before communicating them to the RF-to-baseband module 107.

The RF-to-baseband module 107 may comprise mixers and local oscillators that may be operable to receive RF signals and down-convert them to baseband signals for further processing by the baseband module 111. The RF-to-baseband module 107 may comprise in-phase and quadrature mixers for use with polar signals, for example. The RF module 105 and the RF-to-baseband module 107 may comprise a wide bandwidth such that multiple channels may be received and down-converted to baseband.

The I/Q calibration and compensation module 109 may comprise circuitry operable to measure I and Q mismatch between RF paths in the RF module 105 and the RF-to-baseband module 107.

The baseband module 111 may comprise circuitry operable to process received baseband signals. For example, the baseband module 111 may comprise filters and amplifiers for further processing of the selected baseband signals. In addition, the baseband module 111 may comprise one or more analog-to-digital converters (ADCs) to convert the received analog signals to digital signals for processing by the processor 113.

The processor 113 may comprise a general purpose processor, such as a reduced instruction set computing (RISC) processor, for example, that may be operable to control the functions of the receiver 101. For example, the processor 113 may configure the frequency control module 109 to shift impairments between desired signals so as to reduce or eliminate interference. Additionally, the processor 113 may demodulate baseband signals received from the baseband module 111.

The memory 115 may comprise a programmable memory module that may be operable to store software and data, for example, for the operation of the receiver 101. Furthermore, the memory 115 may store the frequency configurations performed by the frequency control module 109.

Receivers introduce undesirable impairments to a signal when the signal is being amplified, filtered or downconverted. For example, direct conversion receivers, which may also be referred to as "DCR", "zero IF receivers", or "ZIF receivers", are a very efficient way of implementing a radio receiver. However, they introduce a variety of impairments to a signal which can degrade overall performance of the system.

Most notably, signal images due to imbalances in the complex signal path (often referred to as I/Q mismatch) may corrupt the downconverted signal. In a typical RF and analog implementation, the I path and the Q path have gain and phase mismatches. The phase difference between local oscillator (LO) signals for I and Q mixing may deviate from 90 degrees, mixers may have gain imbalance, and filter pole locations may vary due to limited circuit-level matching. In addition, the mismatch between filters may result in frequency-dependent gain and phase mismatches. As such, a wideband input signal may experience gain and phase mismatch with frequency dependency.

Due to I/Q gain and phase mismatch, an image of a channel falls into its image channel. In the channel example shown by RF IN in FIG. 1, the image of channel +1 falls into channel −1 and the image of channel −1 falls into channel +1. Without proper rejection of the images, signal-to-noise ratio and thus system performance may degrade. A strong frequency dependence may make the problem even more challenging. Therefore, calibration and compensation for frequency-dependent I/Q mismatch in a wideband receiver may greatly improve performance.

In an exemplary embodiment, I and Q gain and phase mismatch may be calibrated and compensated for in the receiver 101 utilizing blind source separation (BSS) algorithms on a selected channel and its image. In this scenario, the frequency dependent I/Q mismatch may be calibrated and a compensation process may be executed by the I/Q calibration and compensation module 109 to mitigate the mismatch.

Figure 2:
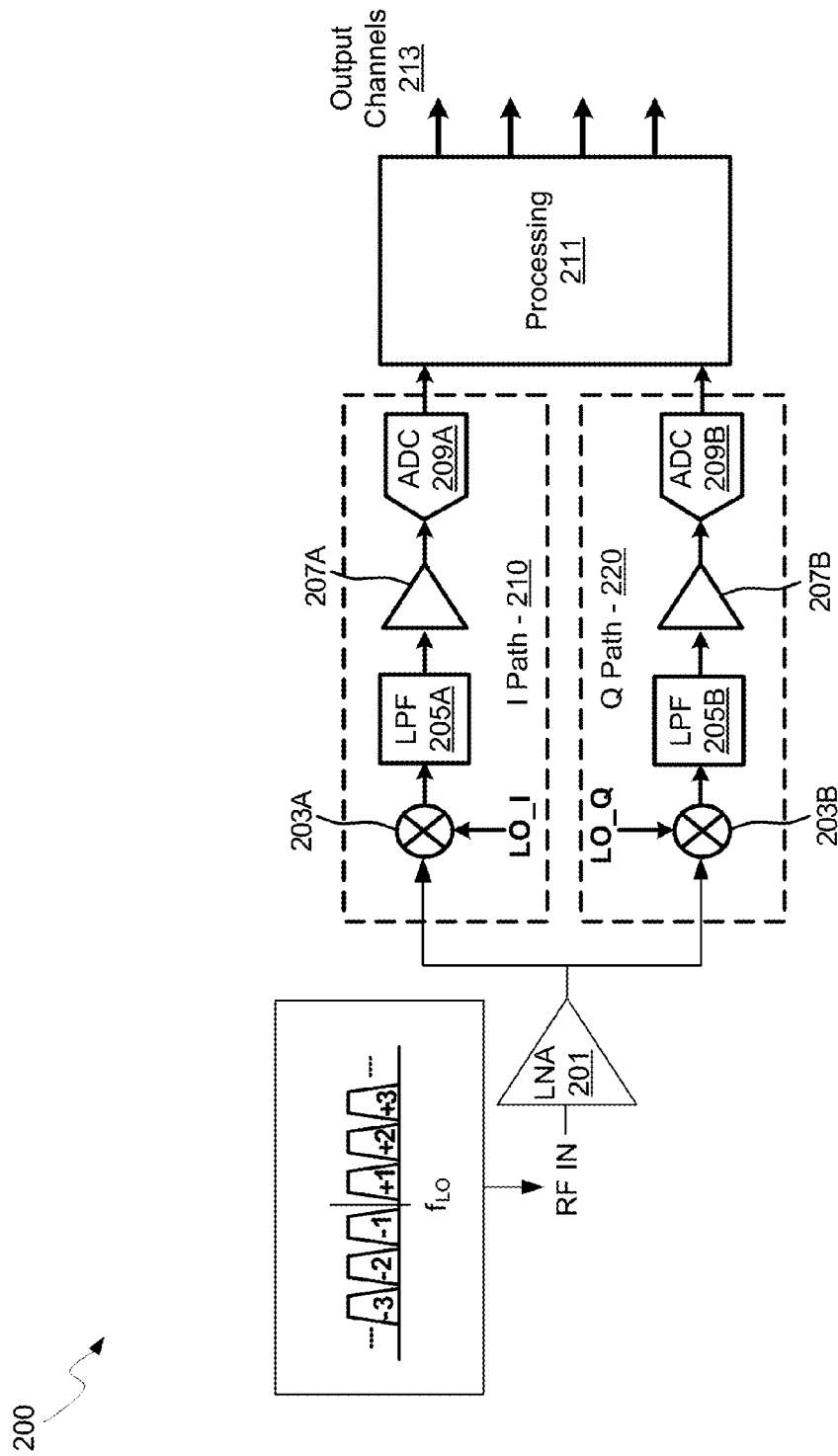
FIG. 2 is a diagram illustrating an exemplary receiver with I/Q mismatch calibration and compensation, in accordance with an embodiment of the invention.

FIG. 2 is a diagram illustrating an exemplary receiver with I/O mismatch calibration and compensation, in accordance with an embodiment of the invention. Referring to FIG. 2, there is shown a receiver 200 comprising a low noise amplifier (LNA) 201, an in-phase (I) path 210, a quadrature (Q) path 220, and a processing module 211. The I path 210 and the Q path 220 may comprise I and Q mixers 203A and 203B, low-pass filters 205A and 205B, local oscillator signals LO_I and LO_Q, gain stages 207A and 207B, analog-to-digital converters (ADCs) 209A and 209B. There is also shown an input signal RF IN comprising the exemplary received channels centered around LO frequency $f_{LO}$ shown in the inset above the signal RF IN and the LNA 201, and output channels 213.

The LNA 201 may be operable to provide amplification to the signal RF In with the amplified signal being communicated to the mixers 203A and 203B. The signal RF In may be down-converted to in-phase and quadrature signals in the I path and Q path in the receiver 200 utilizing the 90 degree phase difference LO signals LO_I and LO_Q.

The mixers 203A and 203B may comprise circuitry that is operable to generate output signals at frequencies that are the sum and the difference between the input RF signal RF In and the local oscillator signal, which comprises either LO_I or LO_Q. The frequency of LO_I and LO_Q may be configured such that it is centered within the desired channels. The local oscillators signals LO_I And LO_Q may be generated by voltage-controlled oscillators in a phase-locked loop, for example, where the frequency of oscillation may be configured by a control voltage.

The low-pass filters 205A and 205B may comprise circuitry that is operable to attenuate signals above a corner frequency and allow signals below the corner frequency to pass. In this manner, sum frequency signals from the mixers 203A and 203B may be filtered while difference frequency signals may be allowed to pass through to the gain modules 207A and 207B.

The gain modules 207A and 207B may comprise amplifiers for amplifying the down-converted and filtered signals. The gain modules 207A and 207B may comprise configurable gain levels, and may be controlled by the processing module 211, for example.

The ADCs 209A and 209B may comprise circuitry that is operable to convert analog input signals to digital output signals. Accordingly, the ADCs 209A and 209B may receive baseband analog signals from the gain modules 207A and 207B and may generate digital signals to be communicated to the processing module 211.

The processing module 211 may comprise a processor similar to the processor 113, for example, described with respect to FIG. 1. Accordingly, the processing module 213 may be operable to control the functions of the receiver 200 and may process received baseband signals to demodulate, deinterlace, and/or perform other processing techniques to the data. Furthermore, the processing module 211 may perform I/Q mismatch calibration and compensation.

In an exemplary scenario, the I/O calibration and compensation process performed by the processing module 211 may calibrate without a calibration signal, and may calibrate the I/O mismatch utilizing the signal being received by the system under normal operation. Furthermore, the calibration and compensation may be performed entirely in the digital domain, thereby inducing no overhead in the RF/analog domain. The digital signal processing required for calibration and compensation may be performed over a pair of channels that are image channels of each other, i.e., channel k and −k, not over the entire wideband signal. This increases power efficiency thereby supporting large capture bandwidth and more scalability to support a large number of channels.

To calibrate and compensate for frequency dependence of any I/O mismatch, the process may approximate the frequency dependency over a channel bandwidth as linear. As such, the I/O gain and phase mismatches may be represented as a sum of an average term and a linearly varying term (i.e., an amplitude tilt for gain mismatch and a phase tilt for phase mismatch), which makes the calibration process more tractable and leads to a more efficient implementation.

The calibration process may be based on blind source separation (BSS) algorithms to estimate the gain and phase mismatch averaged over a certain bandwidth. The amplitude tilt and the phase tilt may be detected by first measuring the average gain and phase mismatch over two sub-bands, one at the lower side of the channel bandwidth and the other at the upper side. The tilts may then be calculated from this two-point measurement.

Figure 3:
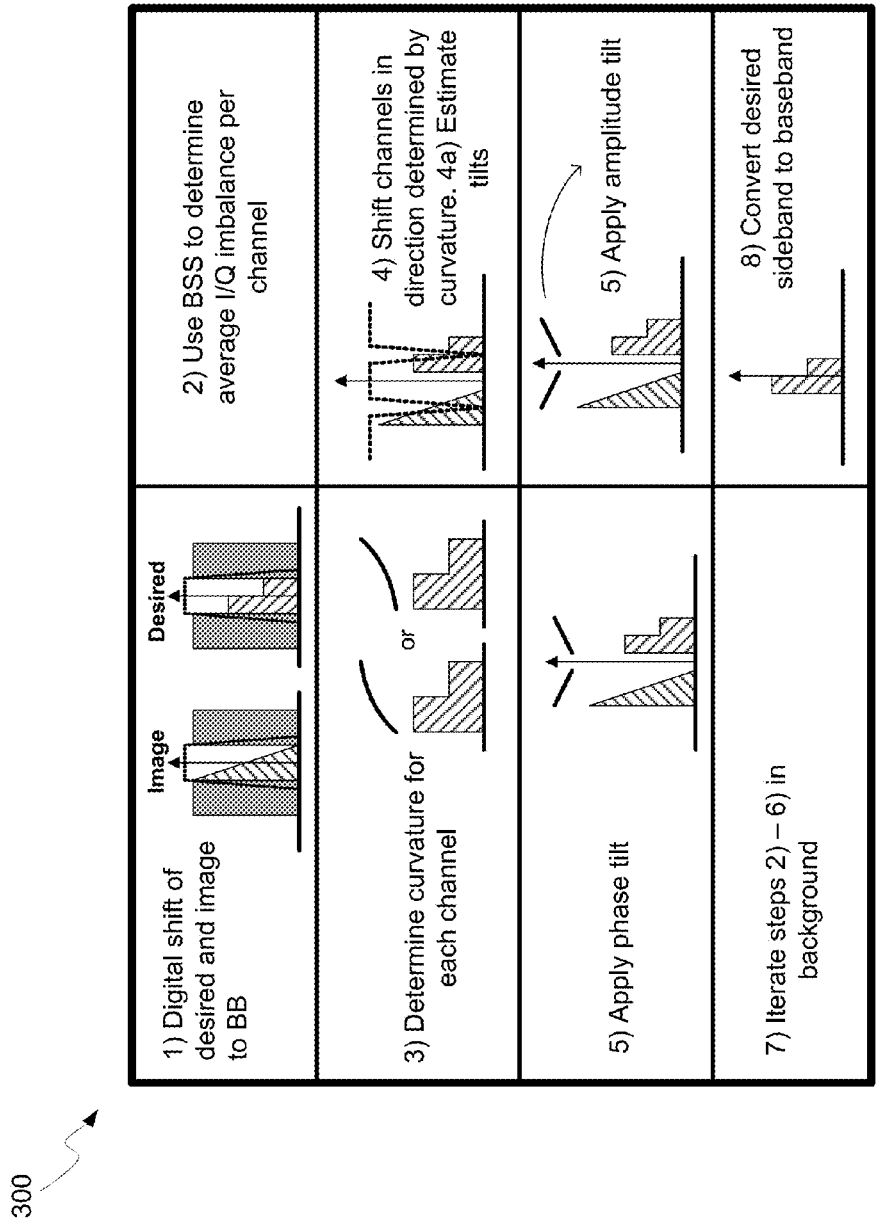
FIG. 3 is a diagram illustrating exemplary steps for I/Q mismatch calibration and compensation, in accordance with an embodiment of the invention.
Figure 4:
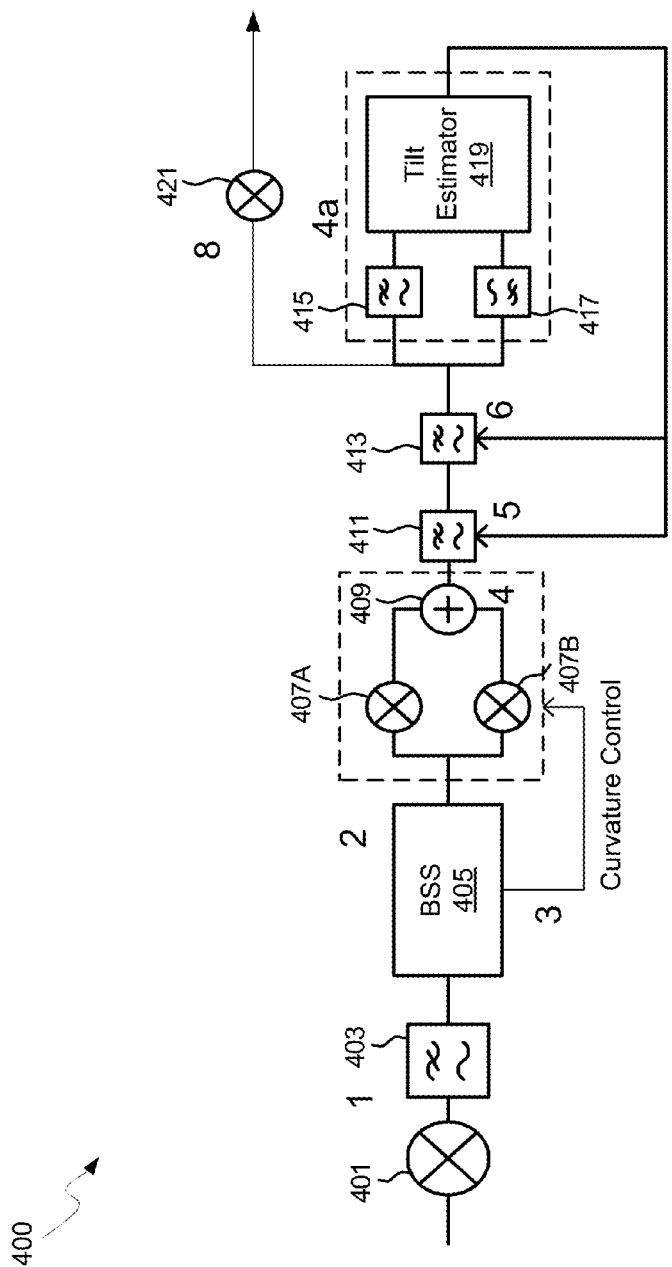
FIG. 4 is a diagram illustrating exemplary I/Q mismatch calibration and compensation circuitry, in accordance with an embodiment of the invention.

The iterative process may compensate for the amplitude and phase tilts via an efficient implementation as described further with respect to FIGS. 3 and 4. The BSS method estimates the complex coupling coefficients between the two channels—the desired and image channels. This coupling coefficient may be reduced in an iterative process. Further, the process may enable independent compensation of the amplitude and phase tilts.

FIG. 3 is a diagram illustrating exemplary steps for I/Q mismatch calibration and compensation, in accordance with an embodiment of the invention. Referring to FIG. 3, there is shown steps 1-8 in I/Q calibration and compensation in the receiver 100.

In step 1, a received digital wideband signal may be down-converted, filtered and down-sampled to generate the digital baseband data samples for a channel k and its image channel −k. In step 2, the average gain and phase mismatch may be estimated over the channel bandwidth. An effective estimation based on blind source separation (BSS) may be utilized with two features for improved I/Q mismatch calibration and compensation. First, the initial conditions of the separating matrix, B, as described further with respect to FIG. 5, may be configured appropriately to improve convergence speed. Additionally, the estimating function, H, also described further with respect to FIG. 5, may be averaged over a number of samples and update the separating matrix B using the average estimating function H. This tends to smooth the convergence and reduces the computation complexity since the rate of updating matrix B is much lower.

For example, in setting the initial condition of the BSS algorithm, variance of the received signal in channel k and −k may be estimated. The variance information may be used to determine if I/Q mismatch calibration and compensation is necessary. The variance information may also be used to determine which image coupling coefficients may be used for tilt estimation, given the asymmetric image rejection performance when the signal power of channel k and −k is not equal.

In an exemplary scenario, the coupling coefficient based on the correlation between signals in the +k and −k channels is zero when there is no I/Q mismatch, and non-zero in the presence of mismatch. Thus, the complex number coupling coefficient may be utilized to determine the phase and amplitude mismatch, and therefore minimized by adjusting gain, LO phase, and/or filter frequency response in the receiver.

In step 3, the curvature of the gain mismatch may be determined for each channel, which may be accomplished using average I/Q mismatch data for each channel.

In step 4, the phase and amplitude tilt may be detected. To do this, the channels k and −k may be shifted in the direction determined by curvature and then summed to form a signal, which may be high-pass filtered and low-pass filtered to pick up two sub-band signals, one at the lower side of the channel bandwidth and the other at the upper side. Then the average gain and phase mismatch may be measured over these two subbands. The tilts may then be calculated from this two-point measurement.

In step 5, the phase tilt may be corrected by passing the summed signal through a phase tilt correction filter, which may comprise all-pass filters. One advantage of all-pass filters is that this enables independent control/correction of the phase tilt and amplitude tilt.

In step 6, the amplitude tilt may be corrected by passing the summed signal through an amplitude tilt correction filter. Steps 2-6 may be subsequently iterated until convergence or process termination occurs. Convergence may be reached when the average coupling coefficient between the $2^{nd}$ or higher order correlation statistics between the channels approaches zero or falls below an acceptable threshold. Once convergence has been reached, the desired sideband may be converted to baseband in step 8.

The above I/Q mismatch calibration and compensation process may be accomplished using the circuitry illustrated in FIG. 4. The calibration process and correction of the frequency-dependent I/Q mismatch may be embedded in the receiver, and thus not require separate calibration paths. After calibration, compensation of the frequency-dependent I/Q mismatch follows by simply applying the average I/Q imbalance, amplitude tilt and phase tilt at the convergence point of the calibration process.

FIG. 4 is a diagram illustrating exemplary I/Q mismatch calibration and compensation circuitry, in accordance with an embodiment of the invention. Referring to FIG. 4, there is shown a receiver 400 with I/Q mismatch calibration and compensation comprising a mixer 401, a low-pass filter 403, a BSS module 405, mixers 407A and 407B, a summer 409, low-pass filters 411, 413, and 415, a high-pass filter 417, a tilt estimator module 419, and an output mixer 421. The components in FIG. 4 may operate exclusively in the digital domain, or with some in analog and some in digital. Furthermore, the steps in the I/Q mismatch calibration and compensation process described with respect to FIG. 3 may correspond to the numbers 1-8 shown in FIG. 4.

The mixer 401 may be operable to down-convert received RF signals to baseband frequencies, and as such may be substantially similar to the mixers 203A and 203B. The low-pass filter 403 may be operable to filter out signals at a frequency above a corner frequency and allow lower frequency signals to pass to the BSS module 405.

The BSS module 405 may comprise circuitry, logic, and/or code that is operable to estimate the average gain and phase mismatch over the bandwidth of the received channel. The BSS module 405 may also be operable to determine the curvature of the gain mismatch for each channel using average I/Q mismatch data for each received channel. Accordingly, the BSS module 405 may be operable to control the gain and phase characteristics of the mixers 407A and 407B to compensate for I and Q mismatch in the receiver. The BSS module 405 may be operable to downsample received digital channel signals.

The mixers 407A and 407B may be operable to downconvert received signals to a lower baseband frequency. The mixers 407A and 407B may down-convert upper and lower frequencies within a channel to enable the determination of I/Q phase and amplitude tilt within the channel.

The summer 409 may be operable to sum the signals down-converted by the mixers 407A and 407B to generate a signal, which may be utilized to determine the phase and amplitude tilts. This may be accomplished by shifting the +k and −k channels in the direction determined by the curvature before summing them.

The signals may then be filtered by the low-pass filter 415 and high-pass filter 417, to generate two sub-band signals, one at the lower side of the channel and the other at the higher side. The average gain and phase mismatch may be measured in these sub-bands by the tilt estimator module 419, which may be utilized to calculate the gain and phase tilt.

The determined tilt values may be utilized to compensate for the gain and tilt by the phase tile correction filter 411 and the amplitude correction filter 413. The tilt estimator 419 may comprise separate circuitry, or may be integrated in the processor module 213, for example.

The curvature and phase and amplitude tilt control loops may be iterated until convergence, upon which the desired sideband may be converted to baseband by the mixer 421.

Figure 5:
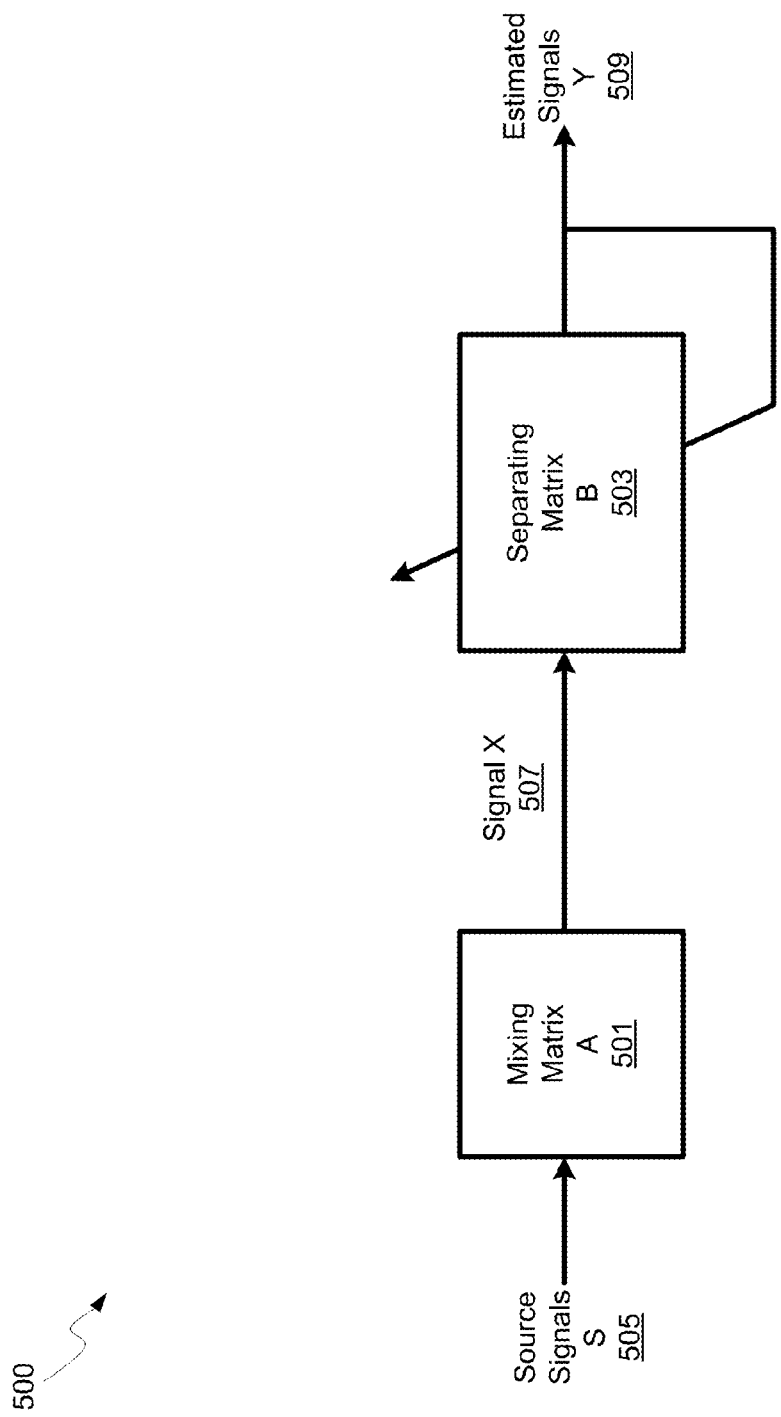
FIG. 5 is a diagram illustrating an exemplary blind source separation algorithm process, in accordance with an embodiment of the invention.

FIG. 5 is a diagram illustrating an exemplary blind source separation algorithm process, in accordance with an embodiment of the invention. Referring to FIG. 5, there is shown a BSS process 500 comprising a mixing matrix A 501 and a separating matrix B 503. There is also shown source signal S 505, signal X 507, and estimated signals Y 509.

Referring to FIG. 5, it is shown that the estimated signals y 509 may be described by $y_t = B_t * x_t$ where $B_t$ is the separating matrix B 503. The BSS algorithm predicts a subsequent separating matrix, $B_{t+1}$, as $B_t - \lambda_t * H(y_t) * B_t$, where H(y) is defined by $H(y) = f(y) * g^H(y) - I$, with I being an identity matrix. Furthermore, $f_i(y_t) = y_i * |y_i|^2$, and $g_i(y_t) = \text{sign}(\text{Re}\{y_i\}) + j*\text{sign}(\text{Im}\{y_i\})$, where i is between 1 and 2, inclusive.

Utilizing the above relations, the BSS module 405 may determine average gain and phase mismatch for I and Q signals and remove the averages, with the resulting signal communicated to circuitry for further processing and tilt estimation, as shown in FIG. 4.

In an embodiment of the invention, a method and system may comprise receiving a plurality of radio frequency (RF) channels −3, −2, −1, +1, +2, +3, downconverting the received plurality of received RF channels −3, −2, −1, +1, +2, +3 to baseband frequencies, determining average in-phase (I) and quadrature (Q) gain and phase mismatch of the downconverted channels, removing the determined average I and Q gain and phase mismatch, determining a residual phase and amplitude tilt 419 of the downconverted channels with removed average I and Q gain and phase mismatch, and compensating for the residual I and Q gain 413 and phase 411 tilt of the downconverted channels utilizing the determined phase and amplitude tilt 419.

A curvature of gain mismatch may be determined for the downconverted channels utilizing a blind source separation (BSS) estimation algorithm 405 and a frequency of the down-converted channels may be shifted in a direction based on the determined curvature. The determined phase tilt may be compensated utilizing a phase tilt correction filter 411, which may comprise one or more all-pass filters. A signal may be passed through the phase tilt correction filter 411 for the compensation, wherein the signal comprises a sum of two channels shifted in frequency based on a determined curvature of the gain mismatch. The average I and Q gain and phase mismatch may be determined utilizing a blind source separation (BSS) estimation algorithm. An estimating function of the BSS algorithm may be averaged over a number of samples and a separating matrix may be updated based on the averaging. The receiver 400 may comprise a direct conversion receiver.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for I/Q mismatch calibration and compensation for wideband communication receivers.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for wireless communication, the method comprising:
   in a communication device:
      receiving a radio frequency (RF) signal in a receiver of said communication device;
      down-sampling said received RF signal to generate a channel k and its image channel −k at baseband frequencies;
      determining average in-phase (I) and quadrature (Q) gain and phase mismatch of said channel k and said image channel −k;
      removing said average I and Q gain and phase mismatch of said channel k and said image channel −k;
      determining, after said removing said average I and Q gain and phase mismatch, a residual phase tilt of said channel k and said image channel −k; and
      compensating for said determined residual phase tilt of said channel k and said image channel −k utilizing a phase tilt correction filter by passing a signal through the phase tilt correction filter, wherein said signal comprises a sum of said channel k and said image channel −k shifted in frequency based on a determined curvature of said gain mismatch.

2. The method according to claim 1, wherein said phase tilt correction filter comprises one or more all-pass filters.

3. The method according to claim 1, wherein said receiver is a direct conversion receiver.

4. The method according to claim 1, comprising determining said average I and Q gain and phase mismatch utilizing a blind source separation (BSS) estimation algorithm.

5. A system for wireless communication, the system comprising:
   one or more circuits for use in a communication device, said one or more circuits being operable to:
      receive a radio frequency (RF) signal in a receiver of said communication device;
      down-sample said received RF signal to generate a channel k and its image channel −k at baseband frequencies;
      determine average in-phase (I) and quadrature (Q) gain and phase mismatch of said channel k and said image channel −k;
      remove said average I and Q gain and phase mismatch of said channel k and said image channel −k;
      determine, after said removing said average I and Q gain and phase mismatch, a residual phase tilt of said channel k and said image channel −k; and
      compensate for said determined residual phase tilt of said channel k and said image channel −k utilizing a phase tilt correction filter by passing a signal through the phase tilt correction filter, wherein said signal comprises a sum of said channel k and said image channel −k shifted in frequency based on a determined curvature of said gain mismatch.

6. The system according to claim 5, wherein said phase tilt correction filter comprises one or more all-pass filters.

7. The system according to claim 5, wherein said receiver is a direct conversion receiver.

8. The system according to claim 5, wherein said one or more circuits are operable to determine said average I and Q gain and phase mismatch utilizing a blind source separation (BSS) estimation algorithm.

9. A system for wireless communication, the system comprising:
   one or more circuits for use in a communication device, said one or more circuits being operable to:
      receive a radio frequency (RF) signal in a receiver of said communication device;
      down-sample said received RF signal to generate a channel k and its image channel −k at baseband frequencies;
      determine average in-phase (I) and quadrature (Q) gain and phase mismatch of said channel k and said image channel −k utilizing an estimation algorithm;
      average an estimating function of said estimation algorithm over a number of samples and update a separating matrix based on said averaging;
      remove said average I and Q gain and phase mismatch of said channel k and said image channel −k;
      determine, after said average I and Q gain and phase mismatch are removed, a residual phase tilt of said channel k and said image channel −k;
      determine a curvature of gain mismatch for said channel k and said image channel −k; and
      compensate for said determined residual phase tilt of said channel k and said image channel −k.

10. The system according to claim 9, wherein said one or more circuits are operable to shift a frequency of said channel k and said image channel −k in a direction based on said determined curvature.

11. The system according to claim 9, wherein said one or more circuits are operable to compensate for said determined residual phase tilt utilizing a phase tilt correction filter comprising one or more all-pass filters.

12. The system according to claim 9, wherein said receiver is a direct conversion receiver.

13. A method for wireless communication, the method comprising:
   in a communication device:
      receiving a radio frequency (RF) signal in a receiver of said communication device;
      down-sampling said received RF signal to generate a channel k and its image channel −k at baseband frequencies;
      determining average in-phase (I) and quadrature (Q) gain and phase mismatch of said channel k and said image channel −k utilizing an estimation algorithm;
      averaging an estimating function of said estimation algorithm over a number of samples and update a separating matrix based on said averaging;
      removing said average I and Q gain and phase mismatch of said channel k and said image channel −k;
      determining a curvature of gain mismatch for said channel k and said image channel −k;
      determining, after said average I and Q gain and phase mismatch are removed, a residual phase tilt of said channel k and said image channel −k; and
      compensating for said determined residual phase tilt of said channel k and said image channel −k.

14. The method according to claim 13, comprising shifting a frequency of said channel k and said image channel −k in a direction based on said determined curvature.

15. The method according to claim 13, comprising compensating for said determined residual phase tilt utilizing a phase tilt correction filter comprising one or more all-pass filters.

16. The method according to claim 13, wherein said receiver is a direct conversion receiver.

17. A method for wireless communication, the method comprising:
in a communication device:
receiving a radio frequency (RF) signal in a receiver of said communication device;
down-sampling said received RF signal to generate a signal k and its image channel −k at baseband frequencies;
determining average in-phase (I) and quadrature (Q) gain and phase mismatch of said channel k and said image channel −k;
determining a curvature of gain mismatch for said channel k and said image channel −k;
removing said average I and Q gain and phase mismatch of said channel k and said image channel −k;
shifting a frequency of said channel k and said image channel −k in a direction based on said determined curvature;
determining, after said removing of said average I and Q gain and phase mismatch, a residual phase tilt of said channel k and said image channel −k; and
compensating for said determined residual phase tilt of said channel k and said image channel −k.

18. The method according to claim 17, wherein a phase tilt correction filter is used for said compensating and comprises one or more all-pass filters.

19. The method according to claim 17, wherein said receiver is a direct conversion receiver.

20. A system for wireless communication, the system comprising:
one or more circuits for use in a communication device, said one or more circuits being operable to:
receive a radio frequency (RF) signal in a receiver of said communication device;
down-sample said received RF signal to generate a signal k and its image channel −k at baseband frequencies;
determine average in-phase (I) and quadrature (Q) gain and phase mismatch of said channel k and said image channel −k;
determine a curvature of gain mismatch for said channel k and said image channel −k utilizing an estimation algorithm;
shift a frequency of said channel k and said image channel −k in a direction based on said determined curvature;
remove said average I and Q gain and phase mismatch of said channel k and said image channel −k;
determine, after said average I and Q gain and phase mismatch are removed, a residual phase tilt of said channel k and said image channel −k; and
compensate for said determined residual phase tilt of said channel k and said image channel −k.

21. The system according to claim 20, wherein said one or more circuits are operable to compensate for said determined residual phase tilt utilizing a phase tilt correction filter comprising one or more all-pass filters.

22. The system according to claim 20, wherein said one or more circuits are operable to average an estimating function of an estimation algorithm over a number of samples and update a separating matrix based on said averaging.

23. The system according to claim 20, wherein said receiver is a direct conversion receiver.

24. A method for wireless communication, the method comprising:
in a communication device:
receiving a radio frequency (RF) signal in a receiver of said communication device;
down-sampling said received RF signal to generate a signal k and its image channel −k at baseband frequencies;
determining average in-phase (I) and quadrature (Q) gain and phase mismatch of said channel k and said image channel −k;
determining a curvature of gain mismatch for said channel k and said image channel −k;
removing said average I and Q gain and phase mismatch of said channel k and said image channel −k;
determining, after said removing of said average I and Q gain and phase mismatch, a residual phase tilt of said channel k and said image channel −k; and
compensating for said determined residual phase tilt of said channel k and said image channel −k, wherein a phase tilt correction filter is used for said compensating and comprises one or more all-pass filters.

25. The method according to claim 24, wherein said receiver is a direct conversion receiver.

26. A system for wireless communication, the system comprising:
one or more circuits for use in a communication device, said one or more circuits being operable to:
receive a radio frequency (RF) signal in a receiver of said communication device;
down-sample said received RF signal to generate a signal k and its image channel −k at baseband frequencies;
determine average in-phase (I) and quadrature (Q) gain and phase mismatch of said channel k and said image channel −k;
determine a curvature of gain mismatch for said channel k and said image channel −k utilizing an estimation algorithm;
remove said average I and Q gain and phase mismatch of said channel k and said image channel −k;
determine, after said average I and Q gain and phase mismatch are removed, a residual phase tilt of said channel k and said image channel −k;
compensate for said determined residual phase tilt of said channel k and said image channel −k; and
average an estimating function of an estimation algorithm over a number of samples and update a separating matrix based on said averaging.

27. The system according to claim 26, wherein said receiver is a direct conversion receiver.

* * * * *